Nov. 7, 1967  C. THOMSON  3,351,179
CONVEYORS
Filed Sept. 28, 1966  4 Sheets-Sheet 2
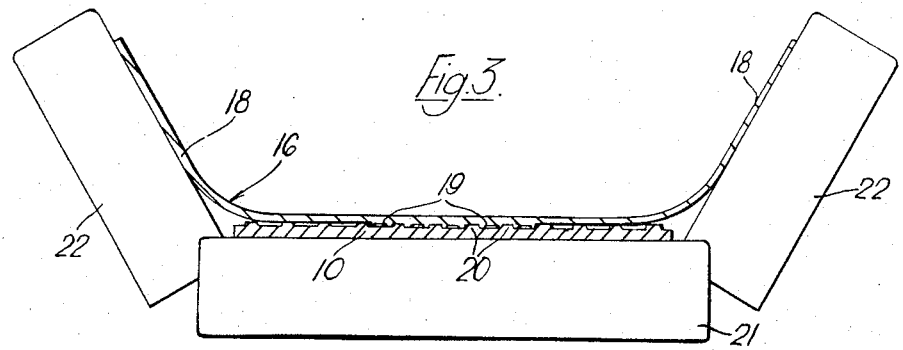
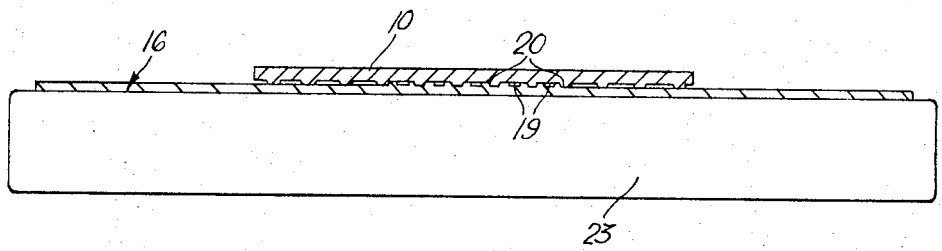
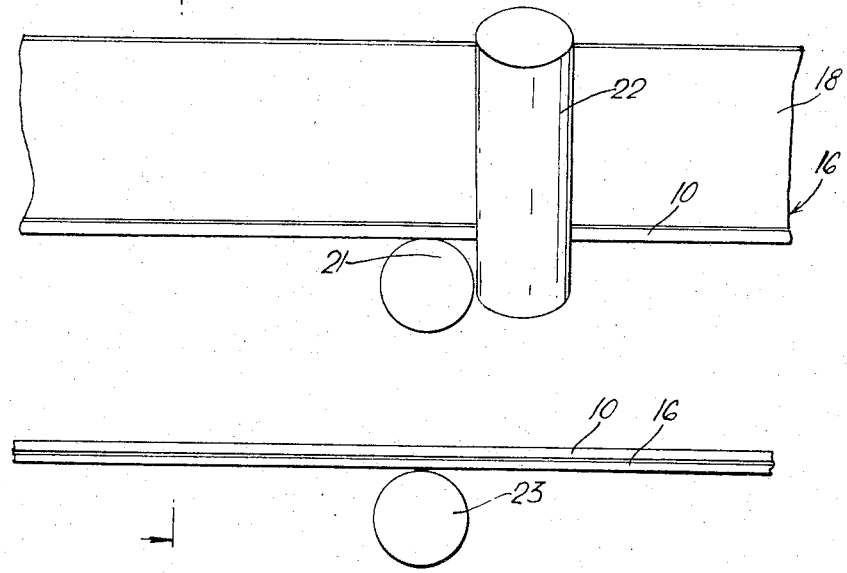

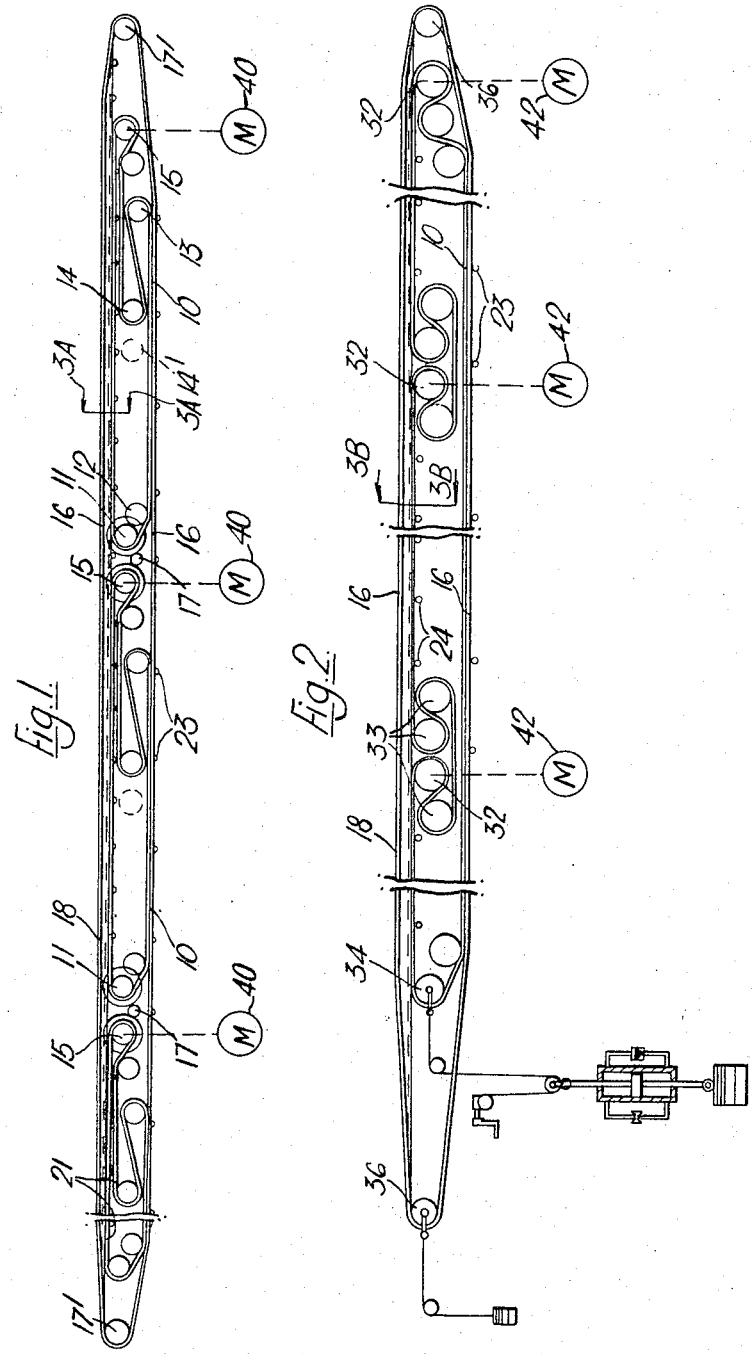

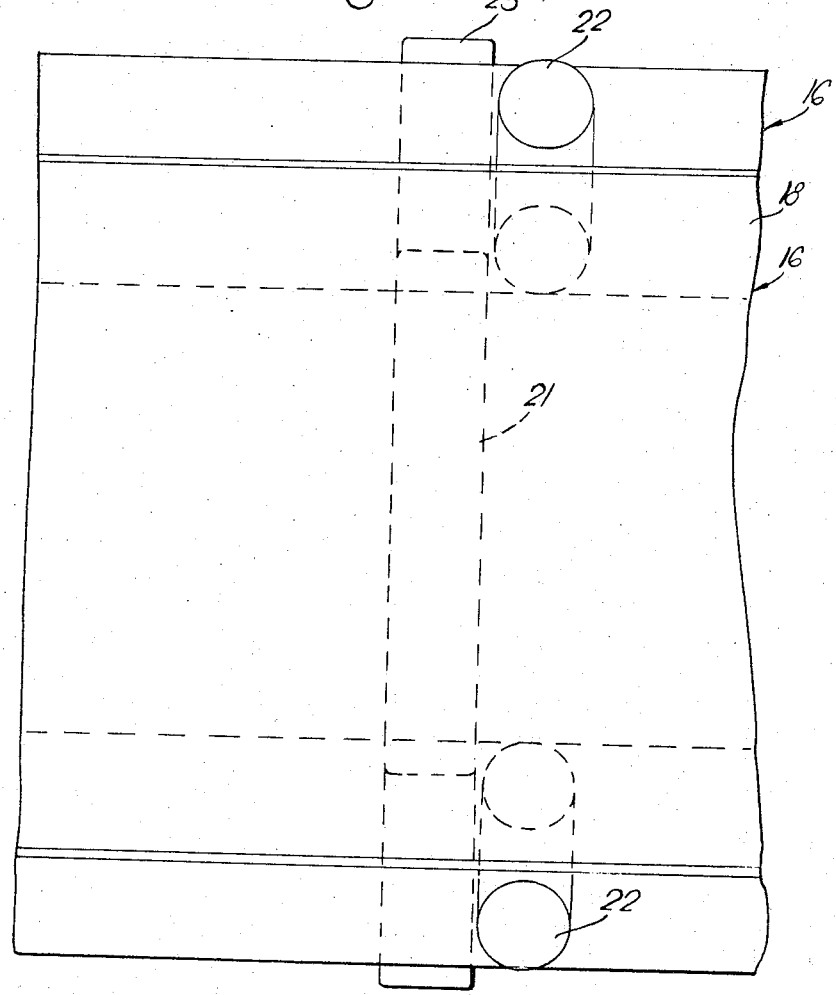

Nov. 7, 1967     C. THOMSON     3,351,179
CONVEYORS
Filed Sept. 28, 1966     4 Sheets-Sheet 4
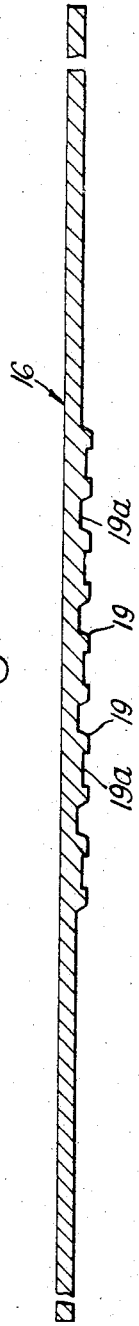
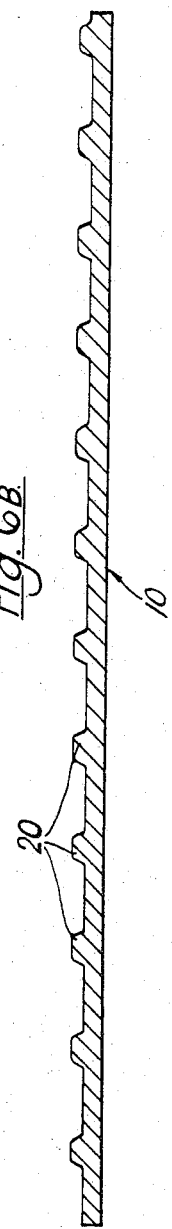
Fig. 6A.
Fig. 6B.

3,351,179
CONVEYORS
Charles Thomson, Esher, England, assignor to Solar Thomson Engineering Company Limited, Camberley, Surrey, England, a British company
Filed Sept. 28, 1966, Ser. No. 582,591
Claims priority, application Great Britain, Oct. 1, 1965, 41,884/65
21 Claims. (Cl. 198—203)

ABSTRACT OF THE DISCLOSURE

A conveyor system having an endless conveyor belt extending over and being driven by a driving belt, the inner surface of the conveyor belt being provided with a longitudinal rib formation extending along the central longitudinal portion thereof and having a width substantially less than the width of the driving belt, the outer surface of said driving belt being provided with a longitudinal rib formation extending over substantially the entire width thereof. One portion of the rib formation of the driving belt meshes in frictional engagement with the rib formation of the endless belt, and another portion of the rib formation of said driving belt frictionally engages at least a portion of the unribbed portion of the inner surface of said conveyor belt.

---

This application relates to conveyors and is a continuation in part of my application, Ser. No. 422,985 filed Jan. 4, 1965, now abandoned.

The invention is concerned particularly with conveyors, including a conveyor belt wrapping and intending to be driven by engagement of the inner surface of said belt with the outer surface of at least one driving belt.

An object of the present invention is to provide for positive driving engagement between and to prevent relative lateral wandering of the driving belt and the conveyor belt.

According to the invention, there is provided a conveyor system comprising at least one driving belt and an endless conveyor belt wrapping and intended to be driven by engagement of the inner surface of said conveyor belt with the outer surface of said driving belt, said surfaces being formed with longitudinal rib formations arranged to mesh in frictional engagement with one another, the inner surface of the conveyor belt being provided with a rib formation only on the central part thereof over a width substantially less than the width of the driving belt and the outer surface of the driving belt being provided with a rib formation meshing with, and extending over a substantially greater width than the rib formation on the conveyor belt. Said rib formation on the inner surface of the conveyor belt may comprise one rib but preferably comprises a plurality of ribs. The outer surface of the driving belt is preferably provided with ribs over substantially its whole width. Preferably, the inner surface of the driving belt is unribbed. Preferably the ribs are of wedge shape in cross-section.

The ribs are preferably continuous but they may be discontinuous.

Preferably, the ribs on the conveyor belt are substantially wider than the spaces therebetween.

Said unribbed portions of the inner side of the conveyor belt may be roughened at least where they are engageable by ribs on the driving belt to increase the frictional grip between the two belts. The ribs on the driving belt which are engageable with the unribbed portions of the inner surface of the conveyor belt may be roughened for the same purpose.

Preferably, the conveyor comprises an endless conveyor belt, and arranged along it, in contact with it and extending over substantially its whole length and over substantially the whole of at least the central portion of the under surface of its load-carrying flight (so as to drive the conveyor belt by the friction between them), a plurality of separate shorter driving-belt sections having their own motor drives, means independent of the conveyor belt being arranged to ensure that when the loading on the conveyor changes all the driving belt sections change speed by the same amount. In accordance with the present invention, said driving friction is increased, and lateral wandering of the belts hindered, by shaping as described above of the surfaces at which the driving belt sections and the conveyor belt interengage.

The driving belt sections may comprise a plurality of shorter endless driving belts. Preferably, the conveyor has positive mechanical interconnection between end drums of adjacent driving belts.

In a modified arrangement, the driving belt sections may be sections of a single endless driving belt. In this case, the driving belt itself is available to transfer excess power from less heavily loaded to more heavily loaded parts of the conveyor, and may accordingly be the only means provided for ensuring that, when the loading on the conveyor changes, all the driving belts change speed by the same amount.

The conveyor belts may be of greater effective width than the driving belt or belts, a plurality of longitudinally spaced idler rollers supporting the load carrying flights of the conveyor belt, and a plurality of longitudinally spaced idle rollers each associated with one of the first-mentioned rollers and supporting each marginal edge portion of said flight being inclined downwardly towards said first-mentioned rollers whereby to form a trough in said flight.

I have found that there is a tendency for the conveyor belt to wander sideways on the idler rollers. Even in cases when, as described in the specification of Patent No. 3,268,065 granted Aug. 23, 1966, the interengaged conveyor and driving belts are located laterally by one or more of the said shaped belt surfaces engaging also with patterning on one or more drums or rollers over which the belt concerned runs, there is sometimes still a tendency for the belts to wander laterally, particularly at positions not adjacent to a patterned drum or roller. It is a further object of the present invention to minimise this tendency.

According to a feature of the present invention, the aforesaid idler rollers supporting the marginal edge portions of the load carrying flight of the conveyor belt are inclined at an angle of at least 45° to the horizontal.

Preferably, the angle of inclination of said idler rollers is greater than the angle of repose between the conveyor belt and the rollers. Thus, it is ensured that the marginal edge portions of the load carrying flight of the conveyor belt slip readily down the inclined rollers so that the portion of said flight between the edge portions is held in contact with the driving belt under the weight of the conveyor belt (plus that of the load, if any).

In practice, it is preferred that the angle of inclination of the idler rollers is 60° or substantially 60°. In some cases, greater angles may be employed.

To assist in lateral location of the driving belt carried by said first-mentioned rollers beneath the conveyor belt, it is preferred that the inclined rollers extend down below the level of the driving belt or belts and are adjacent the sides of the driving belt or belts at the level of the latter. Preferably, each of the aforesaid first-mentioned rollers has two inclined rollers associated therewith adjacent the opposite ends thereof.

The invention is particularly useful in long conveyors, by which expression is meant conveyors exceeding a quarter of a mile in length or lifting the material carried not less than 200 feet.

The following is a description, by way of example, of embodiments of the present invention, reference being made to the accompanying schematic drawings, in which:

FIGURE 1 is a side elevation of one embodiment of a belt conveyor in accordance with the invention;

FIGURE 2 is a side elevation of another embodiment;

FIGURE 3 is an enlarged cross-sectional view of the conveyor of FIGURE 1 on line 3A—3A and of the conveyor of FIGURE 2 on line 3B—3B;

FIGURE 4 is a side view corresponding to FIGURE 3;

FIGURE 5 is a plan view corresponding to FIGURE 3; and

FIGURES 6A and 6B are cross-sections on a larger scale through a conveyor belt and a driving belt respectively.

Referring to FIG. 1 of the drawings, a series of endless driving belts 10 arranged in tandem are each trained in sinuous manner around drums 11, 12, 13, 14 and 15. Each drum 15 is driven by a motor 40. The drum 14 is movable longitudinally of the associated belt 10 to, for example, the position shown at $14^1$ to take up any slack in the belt. A long endless conveyor belt 16 common to all the driving belts 10 wraps said driving belts and is itself trained around end rollers $17^1$ with the upper and the lower flights of the conveyor belt 16 in engagement with the upper and the lower flights of the driving belts 10, so that, during rotation of the driving belts, the conveyor belt 16 is rotated solely by frictional engagement with the driving belts. Gearing 17 couples together the adjacent drums 11, 15 of adjacent driving belts 10.

Referring to FIG. 2 a single endless diving belt 10 is trained in sinuous manner around a series of driving drums 32 spaced apart in tandem. Each driving drum 32 is associated with idler drums 33 to maintain the belt 10 taut. The left hand end of the belt 10 as shown in FIG. 2 is trained around and end drum 34 associated with a tensioning mechanism which forms no part of the present invention. An endless conveyor belt 16 wraps the driving belt 10 and is itself trained around end rollers 36 with the upper and the lower flights of the conveyor belt 16 in engagement with the upper and the lower flights of the driving belt 10, so that, during rotation of the driving belt, the conveyor belt 16 is rotated solely by frictional engagement with the driving belt. Each driving drum 32 is driven by a motor 42 each of which generates the same horse-power, tensioning means being associated with any one or all of the drums.

In order more positively to locate the conveyor belt 16 relatively to the driving belt or belts 10, the inner surface of the conveyor belt 16 is provided with a plurality of continuous parallel longitudinal ribs 19 and the outer surface of each driving belt 10 is provided with a plurality of continuous parallel longitudinal ribs 20 which fit into the spaces between the ribs 19 and have substantially the same cross-section as those spaces so as to engage for frictional drive between the ribs 19. The ribs 19 and 20 are all of wedge shape in cross-section to facilitate their interengagement. The ribs 20 on the driving belt or belts 10 are provided over substantially the whole width of the belt or belts 10. The ribs 19 on the conveyor belt 16 are provided only on the central part thereof over a width substantially less than the width of the driving belt or belts 10 and the ribbing thereon. The ribs 19 are spaced apart from one another laterally for a distance substantially less than the width of each rib 19. Thus the width of each rib 19 is substantially greater than the width of each rib 20. This construction results in increased weight of the conveyor belt in its central part and therefore in improved frictional grip where the conveyor belt bears down on the driving belt. Each rib 19 on the conveyor belt has a longitudinal channel 19a along its inner face. The channels can accommodate dust and dirt which might otherwise prevent interengagement of the ribs 19 and 20 and also may in some cases enable the ribs 19, when under pressure from above, to spread laterally to some extent into wedging engagement with ribs 20. When the conveyor belt 16 is loaded, the load holds the ribs 19 firmly intermeshing with ribs 20 on the driving belt or belts 10 and holds the flat unribbed portions of the belt 16 which border the central portion having the ribs 19 down in engagement with further ribs 20. The tops of the ribs 20 engaging the flat portions of the belt 16 and the portions of the belt 16 engaged thereby may be roughened, e.g. by incorporating hard granular material in the surfaces thereof, so as to increase the frictional grip. When the conveyor belt 16 is not carrying a load, the resilience of the belt 16 and the provision of inclined idler rollers as hereinafter described may cause the side portions of the conveyor belt to tend to move up away from the driving belt. However, the ribs 19 still intermesh with ribs 20 and provide sufficient frictional grip for driving the conveyor belt 16, the weight of the belt 16 being concentrated in its central part owing to the presence of the ribs 19.

Irrespective of whether the conveyor belt is loaded or unloaded, the inclinations of the walls of the ribs in the central portion of the driving belt and the weight of the central portion of the conveyor belt ensure effective wedging of said ribs between the associated ribs in the conveyor belt, and thus effective frictional grip between the belts, even when said belts are inclined.

Some or all of the drums 11 to 15 (FIGURE 1) and 33 (FIGURE 2) engaged by the ribbed outer surface of the driving belt or belts 10 have correspondingly ribbed or grooved surfaces to interengage with the ribs on the driving belt or belts to locate the driving belt or belts laterally relative to the drums.

In very long conveyors of the kind under consideration, the elongation of the drivig belt must be minimised otherwise the tensioning pulley will travel a very considerable distance during the loading and unloading of the conveyor, i.e. during the transition from the empty to the loaded condition. It is therefore important to choose a driving belt with low elongation characteristics, and this design of belt is quite acceptable since it is protected from impact at the loading point by the conveyor belt. When a belt stretches its width contracts. It is therefore also important that the driving belt should have a low elongation since the variation in the pitch of the ribs which mesh with the grooves in the drums must be kept as small as possible. This desired low elongation is quite easily obtainable in a modern belt provided it does not have to withstand impact in service.

Dealing now with the conveyor belt, it is important that the belt should have high elongation characteristics, i.e. should stretch quite freely under load. This is necessary so that it will withstand impact and the general rough treatment to which it is subjected. It is necessary to tension this conveyor belt sufficiently to prevent the edges from sagging between supporting idlers due to the weight of the material on the belt. It follows therefore, due to its elastic characteristics under tension, that this belt will vary in length and in width to a greater degree than the driving belt, and it follows from this that the pitch of the ribs will vary to a greater degree in the conveyor belt than in the driving belt.

As an example of the dimensions, the extension of a suitable conveyor belt, suitably tensioned, would be of the order of 2%, which over a width of 18 inches represents a reduction in width of about 3/8 inch. A driving belt would have an extension of about half this, say 1% corresponding to about 3/16 inch reduction in width. The difference in width variation therefore is of the order of 3/16 inch per 18 inches width. If the meshing width is reduced to say 3 inches, then the variation in width that has to be accommodated is of the order of a 1/32 inch.

Thus, owing to the difference in width variation it is desirable to reduce the width of the ribbing on the conveyor belt to the greatest possible extent so that said width variation does not prevent proper meshing of the ribs. It will be appreciated that the width of ribbing on the conveyor belt must be sufficient to give the desired location and friction of the conveyor belt on the driving belt or belts. Since the conveyor belt meshes with the driving belt or belts for substantially its whole length, a comparatively narrow width of ribbing on the conveyor belt has been found to be satisfactory. However, as regards the driving belt, since the ribs engage grooved drums for only a very short distance, it is not desirable to reduce the width of the ribbing. It has been found desirable that the driving belt should have ribs over substantially greater width than that of the ribbing on the conveyor belt and preferably over substantially its whole width to ensure that the driving belt is properly centered on the grooved pulleys around which it passes.

The conveyor belt 10, which is substantially wider than the driving belt or belts 16, has its marginal portions 18 along the load-carrying flight of the conveyor belt supported by longitudinally-spaced inclined idler rollers 22 so that the belt 10 forms a trough resting on the driving belt or belts 16, the latter being supported on longitudinally spaced idler rollers 21. The conveyor belt is sufficiently flexible for its central portion to lie flat on the driving belt or belts while its marginal portions lie flat on the inclined rollers, as shown in FIGURE 3. On the return flight, the belts are supported by idlers 23. Each idler roller 21 has disposed closely adjacent thereto two inclined idler rollers 22 on opposite sides of the conveyor belt. The axes of the rollers 21 are horizontal while the axes of the rollers 22 are inclined at an angle of 60° to the horizontal. This steep inclination of the rollers 22 causes the marginal portions 18 of the conveyor belt 16 to slip down the rollers 22 so that the ribs on the conveyor belt interengage with those on the driving belt or belts under the weight of the conveyor belt and its load, if any. The rollers 22 extend downwardly below the level of the driving belt or belts on the rollers 21 and adjacent to the edges of the driving belt or belts at the level. Thus, the rollers 22 locate the driving belt or belts laterally.

The conveyor and driving belts may be made from high gravity rubber or other suitable material. As hereinbefore mentioned, the conveyor belt is sufficiently flexible for its central portion to lie flat on the driving belt or belts while its marginal portions lie flat on the inclined rollers, as shown in FIGURE 3. With a conveyor having a conveyor belt and a driving belt or driving belts as described above, it is readily possible to provide a conveyor belt which has the desired flexibility and also adequate strength and toughness. At one time cotton was exclusively used to provide the stress-carrying member in belt carcasses and four or five plies were required to withstand the impact of material being loaded. Since that time, synthetic fibres (e.g. nylon and polyester) have been introduced for the stress-carrying member. The high strength of these fibres in relation to their physical size means that belts of equal strength to the earlier belts are now much thinner and more flexible. It is now possible to use only two plies of quite light fabric for the conveyor belt, so that the belt is almost as supple as a piece of cloth and yet has the required strength and toughness. If necessary, the marginal portions of the belt could be turned up at an angle of 90°. Consequently, this supple belt can be turned up at the edges to a very steep angle, whereas an all-cotton belt would be so rigid that if it were placed in troughing idler rollers inclined at 60° as aforesaid it would not rest with any pressure on the driving belt, but would act as a beam supported at the edges by the inclined idler rollers.

Three main advantages are obtained with the steeply-inclined idler rollers as described above:

(1) The steep edges turn-up of the conveyor belt increases the capacity that can be carried by the conveyor by about 30% when compared with a normal turn-up angle of about 20 to 30 degrees. An angle of about 60° gives the maximum capacity for a given width of belt where the centre roller is about half the width of the belt.

(2) If the angle of turn-up is more than the angle of repose of the belt on the inclined rollers, which angle can be taken as about 45°, then it follows that the complete weight of the conveyor belt rests on the driving belt and is available to provide friction for driving the conveyor belt. This is most important when conveying up steep inclines when the driving belt has to both convey and lift the conveyor belt. It has been found from experience that an angle of 60° provides all the friction between the driving and conveyor belts that is needed.

(3) Due either to mis-alignment of the idler rollers or to the material on the conveyor belt not being placed centrally, there is a tendency for any belt to wander sideways on the idler rollers. A very great advantage of using a steep slope for the inclined rollers of the conveyor is that every few feet the driving belt is restrained from moving sideways by the face of an inclined roller. If this face is presented at an angle of 60° or greater, it will train the belt perfectly, whereas if it were presented at an angle of 20 to 30°, the belt would ride up the inclined roller quite freely.

I claim:

1. A conveyor system comprising at least one driving belt, an endless conveyor belt extending over and being driven by said driving belt, and means to drive said driving belt, the inner surface of said conveyor belt being provided with a longitudinal rib formation extending along the central longitudinal portion thereof and having a width substantially less than the width of the driving belt thereby reducing the variation in width of the rib formation on the conveyor belt in response to elongation of said belt, the outer surface of said driving belt being provided with a longitudinal rib formation extending over substantially the entire width thereof, one portion of the rib formation of said driving belt meshing in frictional engagement with the rib formation of said endless belt, and another portion of the rib formation of said driving belt frictionally engaging at least a portion of the unribbed portion of the inner surface of said conveyor belt.

2. The system according to claim 1, wherein each of said rib formations comprises a plurality of ribs.

3. The system according to claim 1, wherein the inner surface of the driving belt is unribbed.

4. The system according to claim 1, wherein said unribbed portion of the inner surface of the conveyor belt is roughened at least at the portion that is engageable by said rib formation of the driving belt, to increase the frictional grip between the two belts.

5. The system according to claim 1, wherein said another portion of the rib formation of the driving belt is roughened to increase the frictional grip between the two belts.

6. The system according to claim 1, wherein the rib formation of the conveyor belt comprises a plurality of ribs which are substantially wider than the spaces therebetween.

7. The system according to claim 2, wherein each rib is of wedge shape in cross-section.

8. The system according to claim 2, wherein each rib on the conveyor belt has a longitudinal channel along its inner face to permit the sides of the ribs to resiliently engage the sides of the corresponding ribs on the driving belt.

9. A conveyor comprising at least one driving belt, means to drive said driving belt, an endless conveyor belt wrapping and intended to be driven by engagement of the inner surface of said conveyor belt with the outer surface of said driving belt, said surfaces being formed with longitudinal rib formations arranged to mesh in frictional engagement with one another, the rib formation on the conveyor belt being only on the central part thereof thereby reducing the variation in width of the rib formation on the conveyor belt in response to elongation of said belt and the driving belt having ribs over substantially it whole width, inclined rollers carrying the marginal portions of the conveyor belt, and horizontal rollers carrying the driving belt, said driving belt being substantially wider than the rib formation on the conveyor belt, whereby unribbed portions of the conveyor belt engage ribs on the driving belt at least when the conveyor is loaded.

10. A belt conveyor comprising an endless conveyor belt, the inner surface of which is patterned; means for driving said belt, said means extending over substantially the whole length and over substantially the whole of at least the central portion of the load-carrying flight of said conveyor belt, said means comprising at least one endless driving belt having a patterned surface complementary to and in frictional engagement with that of said conveyor belt; a plurality of prime movers for actuating said driving means; and power distributing means independent of the conveyor belt drivingly coupling adjacent prime movers; the inner surface of said conveyor belt being provided with a longitudinal rib formation extending along the central longitudinal portion thereof and having a width substantially less than the width of the driving belt thereby reducing the variation in width of the rib formation on the conveyor belt in response to elongation of said belt and the outer surface of the driving belt being provided with a longitudinal rib formation meshing with, and extending over a substantially greater width than, the rib formation on the conveyor belt.

11. A conveyor according to claim 10, and having at least one roller having a patterned surface complementary to said patterned surface of said driving belt, said driving belt passing around said roller with said patterned surfaces in frictional engagement.

12. A conveyor according to claim 10, wherein said conveyor belt is of greater width than said driving belt, and having a plurality of longitudinally spaced idler rollers supporting the load-carrying flight of the conveyor belt, and a plurality of longitudinally spaced idler rollers supporting each marginal edge portion of said flight and inclined downwardly towards said first-mentioned idler rollers at an angle of at least 45° to the horizontal whereby to form a trough in said flight.

13. A conveyor according to claim 12, and having at least one roller having a patterned surface complementary to said patterned surface of said driving belt, said driving belt passing around said roller with said patterned surfaces in frictional engagement.

14. A conveyor according to claim 12, wherein the angle of inclination of said inclined idler rollers is greater than the angle of repose between the conveyor belt and the inclined idler rollers.

15. A conveyor according to claim 12, wherein the angle of inclination of the inclined idler rollers is about 60°.

16. A conveyor according to claim 12, wherein said first-mentioned idlers carry a length of the driving belt beneath and engaging said load-carrying flight of the conveyor belt and said inclined idlers extend down below the level of said length of the driving belt and are adjacent to the sides of said length at the level of the latter.

17. A conveyor according to claim 12, wherein each of the first-mentioned idler rollers has two inclined idler rollers associated therewith adjacent the opposite ends thereof.

18. A conveyor according to claim 12, wherein said driving means comprises a plurality of endless driving belts and further comprising a plurality of end drums, each of said driving belts passing around a corresponding end drum, said power distributing means comprising a mechanical coupling between adjacent end drums.

19. A conveyor according to claim 12, wherein said driving means comprises a single endless driving belt which couples said prime movers and constitutes said power distributing means.

20. A belt conveyor comprising an endless conveyor belt; means for driving said belt, said means extending over substantially the whole length and over substantially the whole of at least the central portion of the load-carrying flight of said conveyor belt, said means comprising at least one endless driving belt frictionally engaging the conveyor belt; the conveyor belt being wider than the driving belt and the inner surface of said conveyor belt being provided with a longitudinal rib formation extending along the central longitudinal portion thereof and having a width substantially less than the width of the driving belt thereby reducing the variation in width of the rib formation on the conveyor belt in response to elongation of said belt and the outer surface of the driving belt being provided with a longitudinal rib formation meshing with, and extending over a substantially greater width than, the rib formation on the conveyor belt; a plurality of longitudinally spaced idler rollers supporting the load-carrying flight of the conveyor belt; a plurality of longitudinally spaced idler rollers supporting each marginal edge portion of said flight and inclined downwardly towards the first-mentioned idler rollers at an angle of at least 45° of the horizontal whereby to form a trough in said flight; a plurality of prime movers for actuating said driving means; power distributing means independent of the conveyor belt drivingly coupling adjacent prime movers; and at least one roller having a patterned surface complementary to the ribbed surface of said driving belt, said driving belt passing around said roller with said patterned and ribbed surfaces in frictional engagement.

21. A belt conveyor according to claim 20, wherein said rib formation on the conveyor belt comprises a plurality of spaced ribs which are substantially wider than the spaces therebetween and the ribs on the driving belt.

References Cited

UNITED STATES PATENTS 2,863,555  12/1958  Jaritz _____ 198—203
3,268,065  8/1966  Thomson _____ 198—203

RICHARD E. AEGERTER, *Primary Examiner.*